US010517436B2

(12) United States Patent
Arnett et al.

(10) Patent No.: US 10,517,436 B2
(45) Date of Patent: Dec. 31, 2019

(54) BLENDING SYSTEM

(71) Applicant: Vita-Mix Corporation, Olmsted Township, OH (US)

(72) Inventors: Michael Arnett, Columbia Station, OH (US); James Philip Bascom, Brecksville, OH (US); Scott Christopher Bly, Olmsted Falls, OH (US); Richard D. Boozer, Wakeman, OH (US); Kolman Juhasz, Parma, OH (US); David Kolar, Stow, OH (US)

(73) Assignee: VITA-MIX CORPORATION, Olmsted Township, OH (US)

( * ) Notice: Subject to any disclaimer, the term of this patent is extended or adjusted under 35 U.S.C. 154(b) by 819 days.

(21) Appl. No.: 14/195,159

(22) Filed: Mar. 3, 2014

(65) Prior Publication Data

US 2014/0247686 A1 Sep. 4, 2014

Related U.S. Application Data

(60) Provisional application No. 61/771,367, filed on Mar. 1, 2013, provisional application No. 61/789,455, filed on Mar. 15, 2013.

(51) Int. Cl.
*A47J 43/046* (2006.01)
*A47J 43/07* (2006.01)

(52) U.S. Cl.
CPC ......... *A47J 43/046* (2013.01); *A47J 43/0761* (2013.01); *A47J 43/0772* (2013.01)

(58) Field of Classification Search
CPC .. A47J 43/046; A47J 43/0761; A47J 43/0772; B01F 13/0033

USPC ....... 277/457, 514, 552, 530, 566, 626, 644; 316/314; 366/314, 205

See application file for complete search history.

(56) References Cited

U.S. PATENT DOCUMENTS

| 1,463,360 | A | * | 7/1923 | Foote | ..................... B65D 53/02 215/386 |
| 2,075,947 | A | * | 4/1937 | Kennedy | ............... F16L 19/065 277/622 |
| 2,282,866 | A | | 5/1942 | Hagen | |

(Continued)

FOREIGN PATENT DOCUMENTS

| CN | 101904700 | 12/2010 |
| EP | 0041082 | 5/1980 |

(Continued)

OTHER PUBLICATIONS

Young, Lee W., International Search Report and Written Opinion, PCT/US/2014/29446, dated Aug. 5, 2014, International Search Authority/USA.

(Continued)

*Primary Examiner* — Marc C Howell
(74) *Attorney, Agent, or Firm* — McDonald Hopkins LLC

(57) ABSTRACT

A blending system is shown and described herein. The blending system may include a base including a motor, a blade assembly selectively and operably engaged with the base, where the motor drives the blade assembly, and a container having an inner and outer layer. The blending system may also include a magnet positioned between inner and outer layers of the container, and a sensor positioned in the base, where the magnet in operative proximity to the sensor permits operation of the motor.

14 Claims, 10 Drawing Sheets

(56) References Cited

U.S. PATENT DOCUMENTS

| | | | |
|---|---|---|---|
| 2,622,187 A * | 12/1952 | Welch | A47J 27/088 |
| | | | 126/374.1 |
| 2,700,561 A * | 1/1955 | Svenson | F16J 15/3236 |
| | | | 277/566 |
| RE24,332 E * | 6/1957 | Svenson | F16J 15/3236 |
| | | | 277/566 |
| 2,841,429 A * | 7/1958 | McCuistion | F16J 15/3236 |
| | | | 251/900 |
| 2,873,132 A * | 2/1959 | Tanner | F16J 15/32 |
| | | | 220/378 |
| 3,047,300 A * | 7/1962 | Taylor | F16J 15/3204 |
| | | | 277/530 |
| 3,047,301 A * | 7/1962 | Taylor | F16J 15/0887 |
| | | | 277/612 |
| 3,098,660 A * | 7/1963 | Hausner | F16J 15/20 |
| | | | 277/530 |
| 3,288,475 A * | 11/1966 | Benoit | F16J 15/32 |
| | | | 277/566 |
| 3,312,149 A * | 4/1967 | Fleckenstein | F16J 10/02 |
| | | | 277/566 |
| 3,322,433 A * | 5/1967 | Rentschler | B32B 27/00 |
| | | | 277/644 |
| 3,347,556 A * | 10/1967 | Fleckenstein | F16J 15/32 |
| | | | 277/566 |
| 4,335,860 A | 6/1982 | Grandel et al. | |
| 4,448,429 A * | 5/1984 | Thomas | F16J 15/32 |
| | | | 277/582 |
| 4,471,915 A | 9/1984 | Levin et al. | |
| 4,475,738 A * | 10/1984 | Eicher | F16J 15/545 |
| | | | 277/345 |
| 4,678,881 A | 7/1987 | Griffith | |
| 4,741,482 A | 5/1988 | Coggiola et al. | |
| 4,787,642 A * | 11/1988 | Etheridge | E21B 33/04 |
| | | | 277/550 |
| 4,827,834 A * | 5/1989 | Leigh-Monstevens | |
| | | | F16J 1/008 |
| | | | 192/85.54 |
| 4,885,917 A | 12/1989 | Spector | |
| 4,913,555 A | 4/1990 | Maeda et al. | |
| 4,993,840 A | 2/1991 | Maeda et al. | |
| 5,273,358 A | 12/1993 | Byrne et al. | |
| 5,274,207 A | 12/1993 | Griffith | |
| 5,368,384 A | 11/1994 | Duncan et al. | |
| 5,372,422 A * | 12/1994 | Dubroy | A47J 36/165 |
| | | | 366/143 |
| 5,397,950 A * | 3/1995 | Norbury, Jr. | H02K 5/24 |
| | | | 310/51 |
| 5,478,149 A | 12/1995 | Quigg | |
| 5,567,049 A | 10/1996 | Beaudet et al. | |
| 5,655,834 A | 8/1997 | Dickson | |
| 5,852,968 A | 12/1998 | Sundquist | |
| 5,855,431 A | 1/1999 | Costanzo | |
| 6,095,677 A | 8/2000 | Karkos, Jr. et al. | |
| 6,149,035 A | 11/2000 | Gorski et al. | |
| 6,196,552 B1 * | 3/2001 | Peterson | B29C 45/14311 |
| | | | 277/437 |
| 6,210,033 B1 | 4/2001 | Karkos, Jr. et al. | |
| 6,318,247 B1 | 11/2001 | Di Nunzio et al. | |
| 6,325,312 B1 | 12/2001 | Karkos, Jr. | |
| 6,336,603 B1 | 1/2002 | Karkos, Jr. et al. | |
| 6,416,215 B1 | 7/2002 | Terentiev | |
| 6,460,368 B1 | 10/2002 | Grande Damaso | |
| 6,494,390 B1 | 12/2002 | Khait et al. | |
| 6,513,966 B1 | 2/2003 | Gort-Barten et al. | |
| 6,540,234 B1 * | 4/2003 | Atkinson | F16J 15/0825 |
| | | | 277/314 |
| 6,540,394 B2 | 4/2003 | Juriga | |
| 6,554,466 B1 | 4/2003 | Lee | |
| 6,568,843 B1 | 5/2003 | Lai | |
| 6,595,113 B1 | 7/2003 | Chang | |
| 6,629,492 B1 | 10/2003 | Li | |
| 6,637,681 B1 | 10/2003 | Planca et al. | |
| 6,712,497 B2 | 3/2004 | Jersey et al. | |
| 6,758,593 B1 | 7/2004 | Terentiev | |
| 6,761,107 B2 * | 7/2004 | Oshita | A21B 7/005 |
| | | | 366/146 |
| 6,793,167 B2 | 9/2004 | Karkos, Jr. et al. | |
| 6,854,876 B2 * | 2/2005 | Dickson, Jr. | A47J 43/0716 |
| | | | 206/518 |
| 6,899,454 B2 | 5/2005 | Terentiev | |
| 6,910,800 B2 | 6/2005 | Wu | |
| 7,004,474 B2 * | 2/2006 | Takahashi | F16J 15/3456 |
| | | | 277/402 |
| 7,270,156 B2 | 9/2007 | Beesley et al. | |
| 7,314,307 B2 | 1/2008 | Cai | |
| 7,318,666 B1 | 1/2008 | Lin | |
| 7,407,320 B1 | 8/2008 | Lin | |
| 7,441,944 B2 * | 10/2008 | Sands | A47J 43/046 |
| | | | 366/205 |
| 7,530,510 B2 | 8/2009 | Newman et al. | |
| 7,614,447 B2 * | 11/2009 | Jennings | E21B 33/04 |
| | | | 166/84.1 |
| 7,641,380 B2 * | 1/2010 | Behar | A47J 43/0722 |
| | | | 241/282.1 |
| 7,740,080 B2 * | 6/2010 | Fenton | E21B 33/04 |
| | | | 166/387 |
| 7,871,196 B2 | 1/2011 | Lin | |
| 7,905,728 B2 | 3/2011 | Piontek | |
| 8,087,818 B2 | 1/2012 | Drees | |
| 8,186,872 B2 | 5/2012 | Bartholomew et al. | |
| 8,220,730 B2 | 7/2012 | Ferraby et al. | |
| 8,230,774 B1 | 7/2012 | Hunte | |
| 8,240,909 B2 | 8/2012 | Athey et al. | |
| 8,282,268 B2 | 10/2012 | Karkos, Jr. et al. | |
| 8,360,480 B2 | 1/2013 | Athey et al. | |
| 8,376,253 B2 | 2/2013 | Oblak et al. | |
| 8,403,555 B2 | 3/2013 | Wu | |
| 8,403,556 B2 | 3/2013 | Wu | |
| 8,480,292 B2 | 7/2013 | Dushine et al. | |
| D690,272 S * | 9/2013 | Kline | D13/155 |
| 8,550,388 B2 | 10/2013 | Donaldson et al. | |
| 8,608,371 B2 | 12/2013 | Bartholomew et al. | |
| 8,621,982 B2 | 1/2014 | Nosler et al. | |
| 8,621,990 B2 | 1/2014 | Fang et al. | |
| 8,702,300 B2 | 4/2014 | Audette | |
| 8,814,072 B2 | 8/2014 | Gushwa | |
| 2002/0009016 A1 * | 1/2002 | Ancona | A47J 27/62 |
| | | | 366/205 |
| 2002/0071340 A1 | 6/2002 | Juriga | |
| 2003/0213373 A1 * | 11/2003 | Dickson, Jr. | A47J 43/0716 |
| | | | 99/348 |
| 2005/0068847 A1 | 3/2005 | Sands | |
| 2005/0174882 A1 | 8/2005 | Krasne et al. | |
| 2006/0176765 A1 | 8/2006 | Pryor, Jr. et al. | |
| 2006/0286215 A1 | 12/2006 | Xu et al. | |
| 2008/0037360 A1 | 2/2008 | McGill | |
| 2008/0089170 A1 | 4/2008 | Larsen et al. | |
| 2008/0098905 A1 | 5/2008 | Steiner et al. | |
| 2008/0198688 A1 | 8/2008 | Peng | |
| 2008/0264927 A1 | 10/2008 | Peng | |
| 2009/0084274 A1 | 4/2009 | Kovacic et al. | |
| 2009/0186139 A1 | 7/2009 | Dragan | |
| 2009/0260523 A1 | 10/2009 | Peng | |
| 2010/0018982 A1 | 1/2010 | Liu | |
| 2010/0044303 A1 | 2/2010 | Perrault et al. | |
| 2010/0046323 A1 | 2/2010 | Tien et al. | |
| 2011/0186172 A1 | 8/2011 | Herbert | |
| 2011/0232506 A1 | 9/2011 | Cai | |
| 2011/0241503 A1 | 10/2011 | Simon | |
| 2011/0248108 A1 | 10/2011 | Carriere | |
| 2011/0249926 A1 * | 10/2011 | Gruber | F16C 19/181 |
| | | | 384/486 |
| 2012/0206995 A1 | 8/2012 | Wu | |
| 2012/0275852 A1 | 11/2012 | Athey et al. | |
| 2012/0294109 A1 | 11/2012 | Boozer | |
| 2013/0028044 A1 | 1/2013 | Karkos, Jr. et al. | |
| 2013/0043337 A1 | 2/2013 | Rukavina et al. | |
| 2013/0319034 A1 | 12/2013 | Kounlavong et al. | |
| 2013/0344204 A1 | 12/2013 | Goodson | |
| 2014/0212566 A1 | 7/2014 | Herbert et al. | |

(56) References Cited

U.S. PATENT DOCUMENTS

FOREIGN PATENT DOCUMENTS

| | | |
|---|---|---|
| EP | 0024992 | 3/1981 |
| EP | 1647217 | 4/2006 |
| EP | 1688046 | 8/2006 |
| WO | WO2011/113083 | 9/2011 |
| WO | 2014008926 | 1/2014 |
| WO | 2014009339 | 1/2014 |
| WO | 2014121838 | 8/2014 |
| WO | 2014122254 | 8/2014 |
| WO | 2014122257 | 8/2014 |
| WO | 2014122260 | 8/2014 |

OTHER PUBLICATIONS

International Search Report and the Written Opinion of the International Searching Authority, PCT/US2014/019866, Vita-Mix Corporation, dated Jun. 25, 2014.

Communication of the European Patent Office for Application No. 14756728.3 dated Nov. 22, 2018; 4 pages.

* cited by examiner

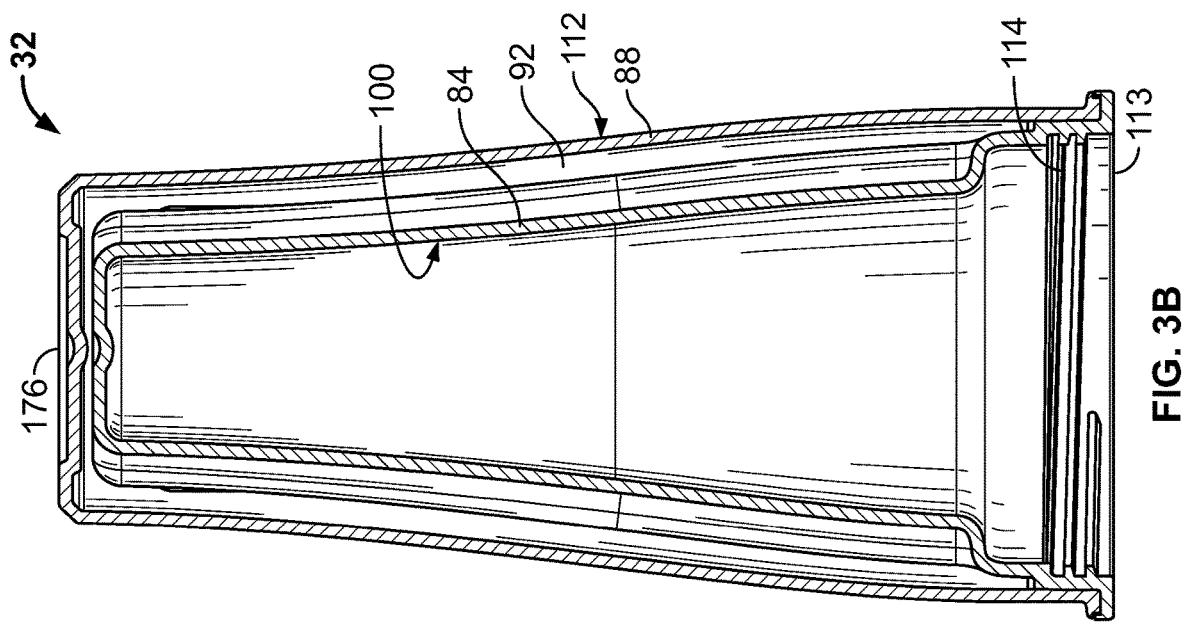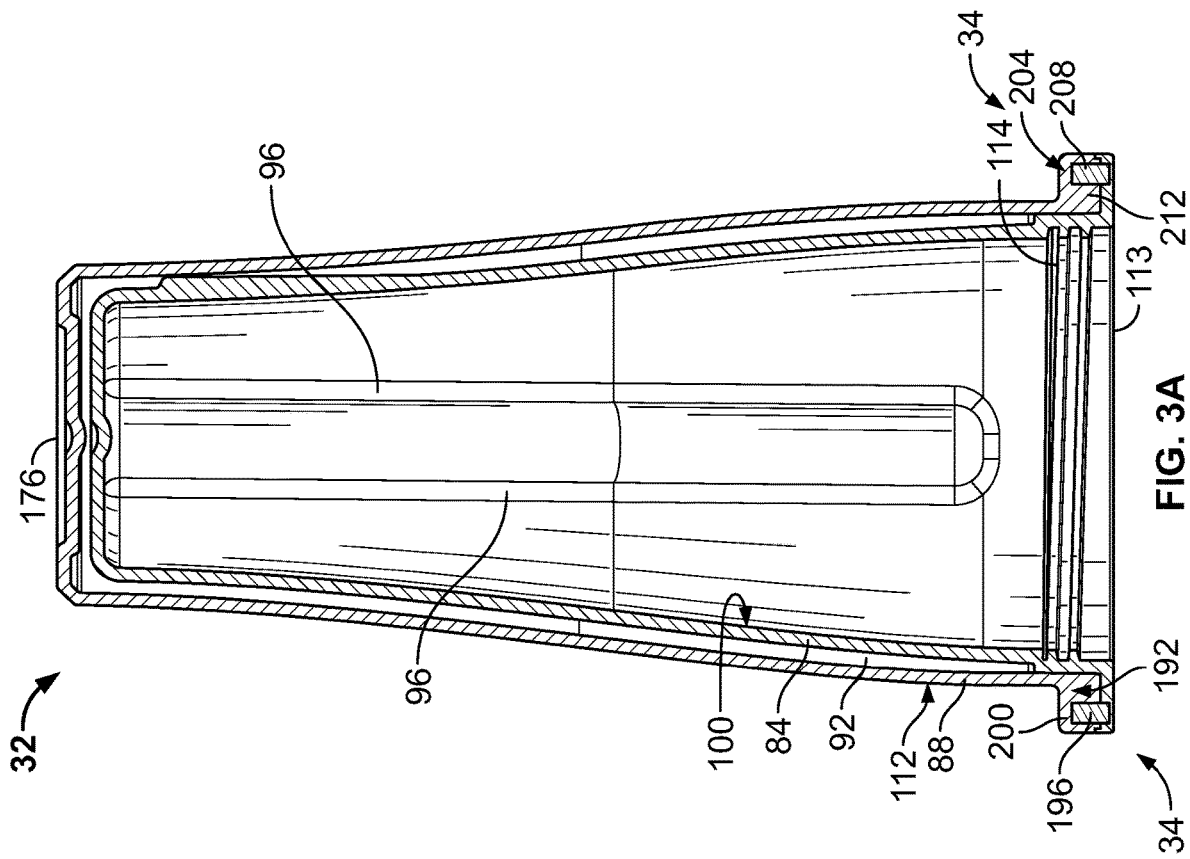

BLENDING SYSTEM

CROSS-REFERENCE TO RELATED APPLICATION

This application claims the benefit of U.S. Provisional Patent Application Ser. No. 61/771,367, filed Mar. 1, 2013, and entitled "Blender System," and U.S. Provisional Patent Application Ser. No. 61/789,455, filed Mar. 15, 2013, and entitled "Quad Seal for a Blender," both of the above which are incorporated herein by reference.

TECHNICAL FIELD

The present teachings relate to a blending system, and more particularly, to a high performance, small format blending system.

BACKGROUND

Blending systems are often used to blend and process foodstuffs. In recent years, personal blending systems have been developed with blending containers that are designed to serve a dual purpose and function as both a blending container and a drinking vessel. Typically, the container may include the foods for blending and then will connect at its top with a blade assembly. Once connected, the user may invert the container/blade assembly so that the container/blade assembly engages with the personal blending system base. Once blending is completed, the user may remove the container/blade assembly from the base, invert it again, and remove the blade assembly from the cup. The user can then directly drink from that container, or insert a top on the container for later use.

The personal blending system may have an interface between the container and the blade assembly, such as an O-ring. This interface may generally prevent liquid from leaking out of the container when attached to the blade assembly. That O-ring may typically include a solid round or square cross-sectional shape. This shape may generally create an air-tight seal between the two structures.

However, those conventional personal blending systems have relatively small motors and thus, do not observe the potential pressure build-up in the container as would a blender with a high performance motor, such as a 2 HP motor. As a result, the use of a conventional sealing system with a high performance blender can create a large and unsafe pressure condition within the container.

SUMMARY

A blending system may include a base including a motor, a blade assembly selectively and operably engaged with the base, where the motor drives the blade assembly, and a container having an inner and outer layer. The blending system may also include a magnet positioned between inner and outer layers of the container, and a sensor positioned in the base, where the magnet in operative proximity to the sensor permits operation of the motor.

A blending system may include a base encasing a motor and a blade base in operative communication with the motor and selectively engaged with the base. The blade base may include an interior surface having a generally rectangular configuration, a blade positioned in proximity to the interior surface and operatively engaged with the motor, and an engagement member. The blade assembly may also include a container having a container engagement member selectively attached with the engagement member of the blade base.

A blending system may include a base encasing a motor, a blade assembly in operative communication with the motor and selectively engaged with the base, and a container selectively engaged with the blade assembly. The blending system may also include a gasket positioned between the container and blade assembly, where the gasket is configured to create a seal between the blade assembly and container at a first pressure and to allow gas to exit between the container and blade assembly at a second pressure.

DESCRIPTION OF THE DRAWINGS

The present teachings may be better understood by reference to the following detailed description taken in connection with the following illustrations, wherein:

FIG. 3A is a first cross-sectional view of a blending cup;

FIG. 3B is a second cross-sectional view of the blending cup;

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

Figure 1:
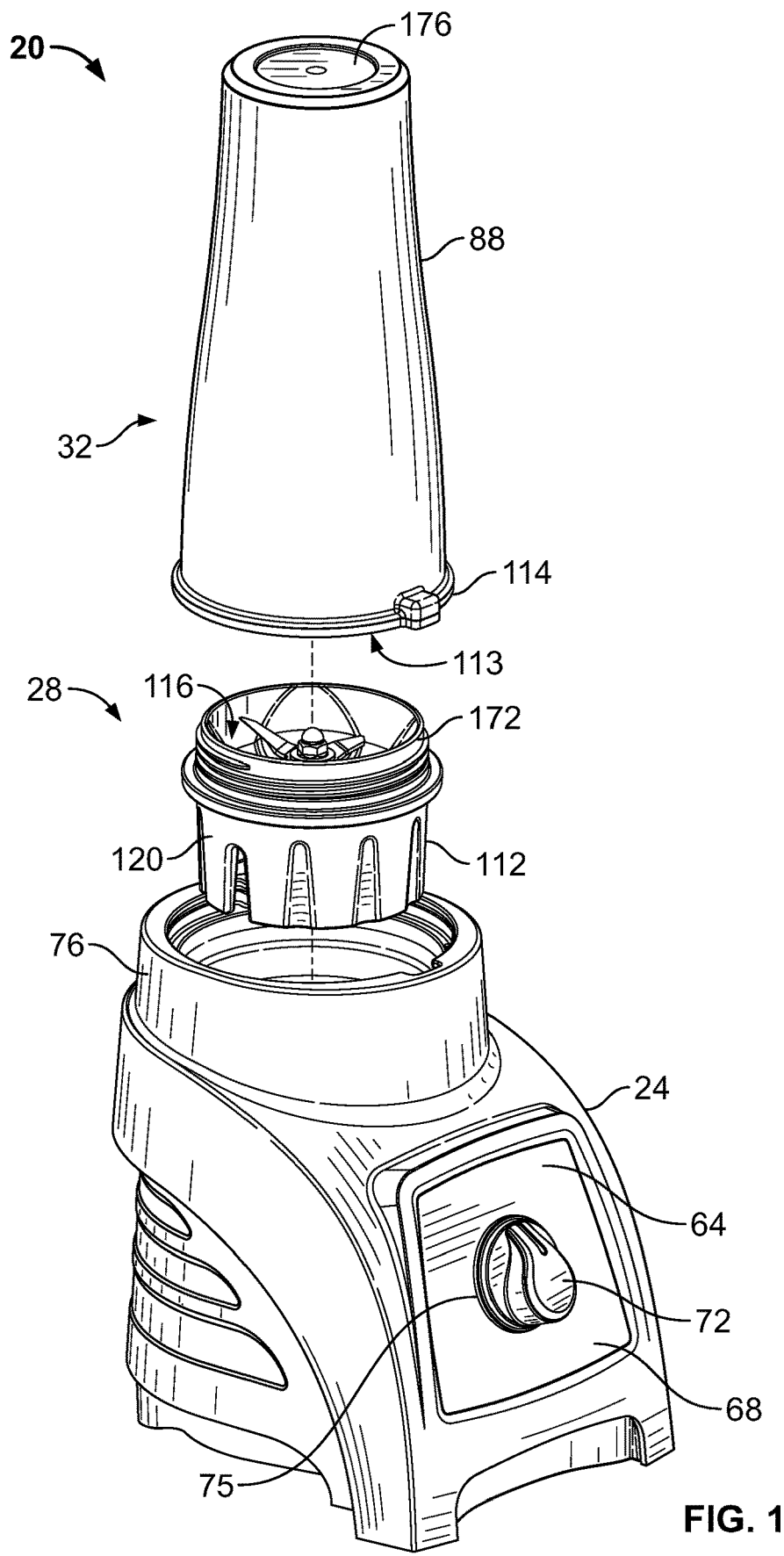
FIG. 1 is a perspective view of a blender system with a blending container.

A blending system 20 of the present teachings is shown in FIG. 1. The blending system 20 may include a blender base 24, a blade base 28 and at least one blending container 32 of appropriate configurations. The blade base 28 may be selectively and operatively coupled with the blender base 24 and the blending container 32 as described in more detail below. The blending system 20 may include an interlock feature 34 that may generally prevent operation of the blending system when and if the blending container and blade base 28 become disengaged as described in more detail below. The blending system 20 may have a smaller configuration than traditional blending systems. The blending system 20 may have a smaller footprint and smaller profile than traditional blending systems. The blending system 20 may be considered a personal or individual blending system. However, it should be understood that the present teachings are not limited to personal blending system. The present teachings may apply to any appropriate blending system.

Figure 2:
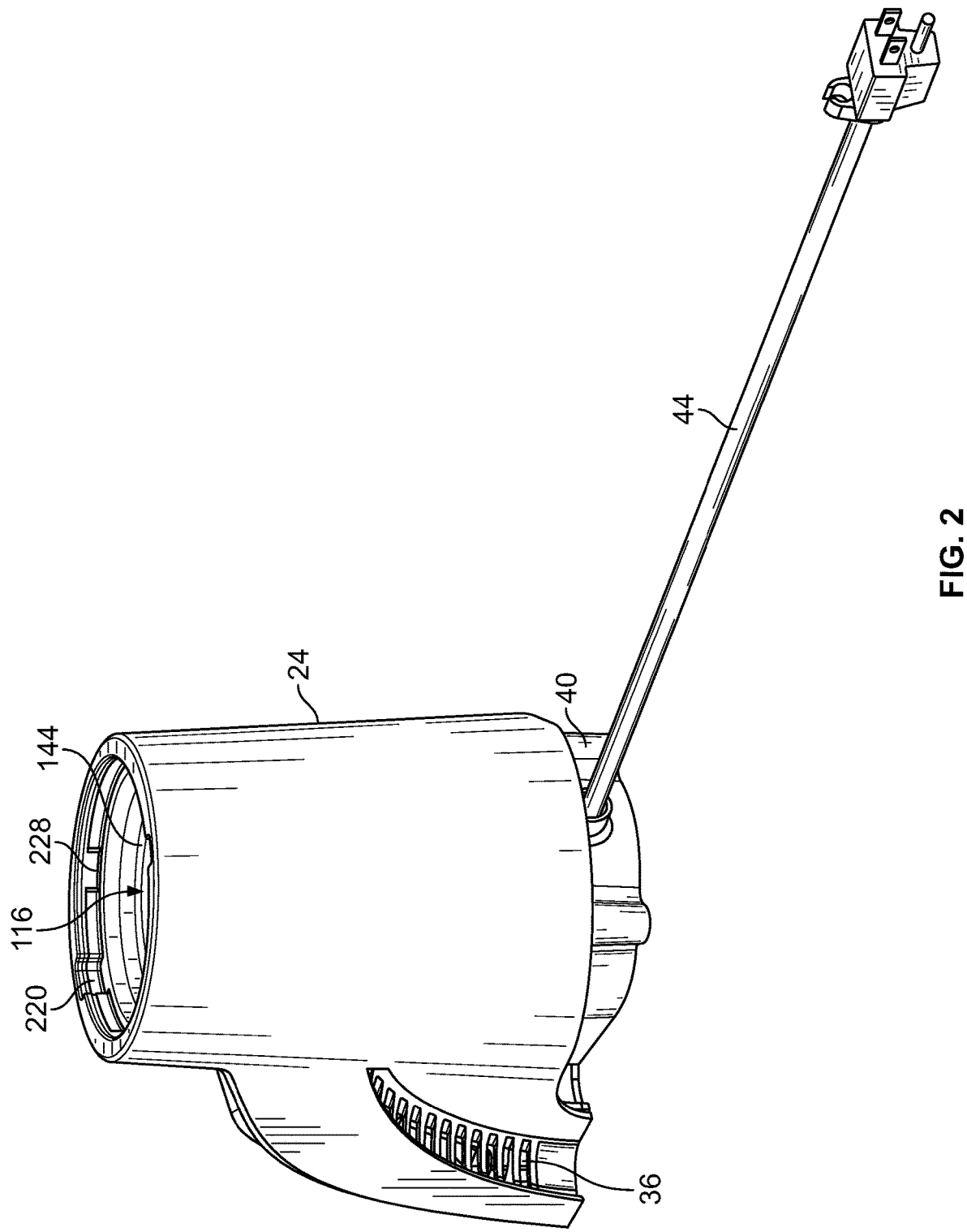
FIG. 2 is a perspective view of a blender base of the blender system.

As shown in FIG. 2, the blender base 24 may be any appropriate size and configuration. The blender base 24 may be of a configuration to house and generally protect the operative components of the blending system 20. The blender base 24 may house a high performance motor, gearing, sound damping components, and fan (all not shown). These operative components may be of any appropriate configuration—the present teachings are not limited to any specific configuration.

The blender base 24 may include vents 36 of any appropriate configuration. The vents 36 facilitate exhaustion of air generated within the blender base 24.

The motor 40 may be in operative communication with a power cord 44 configured to operatively communicate with a power supply source to provide the appropriate power to operate the blending system 20. The power cord 44 may be of any appropriate configuration—the present teachings are not limited to the configurations shown and described herein.

As shown in FIG. 1, the blender base 24 may include a control panel 64 positioned on a face 68 of the blender base 24. The control panel 64 may be of any appropriate configuration and may be utilized to set the operative condition of the blending system 20 by the user. By way of a non-limiting example, the control panel 64 may include a knob 72 to selectively adjust settings of the blending system 20, including, without limitation setting rotational speed of the blade base 28 during operation of the blending system 20. The knob 72 can also be used to reset the system, turn the system on/off, select preprogrammed functions, and/or select a pulse function. It will be appreciated that the control panel 64 may further include alternative or additional input devices, such as buttons and switches, and other feedback and readout devices, such as an LCD or LED display.

The blender base 24 may include a pedestal 76 at a top portion of the blender base 24. The pedestal 76 may be of any appropriate shape and size and can be materially integral with the blender base 24. By way of a non-limiting example, the pedestal 76 may be sized and shaped to cooperate with the blade base 28 as described in more detail below. The pedestal 76 may be of a shape such that an interior of the pedestal 76 corresponds with the external shape of the blade base 28. In the present example, the interior shape of the pedestal 76 and the external shape of the blade base 28 are generally circular.

The blending system 20 includes a first blending container 32 that may be of any appropriate configuration shape and size. The first blending container 32 may be of a configuration to act as a single serve container, i.e., it is a smaller size than a standard blender. The first blending container 32 may also be of a configuration to act as a drinking vessel. The first blending container 32 may be a variety of sizes, including, but not limited to, a 20 oz., 24 oz., 32 oz., or a 40 oz . . . size.

The first blending container 32 may be a double-walled container having an inner layer 84 and an outer layer 88 spaced from the inner layer 84. A space 92 may be formed between the inner and outer layers 84, 88. The space 92 may provide an insulative feature to the first blending container 32, i.e., it may help the contents thereof remain cool or warm, as applicable. Further, the first blending container 32 may include elongated ribs 96 projecting from an interior side 100 of the inner layer 84 into a blending are of the first blending container 32. The ribs 96 may comprise one or more protrusions generally spanning a length of the blending container 32. In the present example, there are two ribs spaced at opposing sides of the first blending container 32. The ribs 96 may be configured to aid in agitating the contents of the first blending container 32 during blending.

The first blending container 32 also includes a plurality of fins 97 positioned between an outer wall of the inner layer 84 and an inner wall of the outer layer 88. One or more fins 97 can project outwardly from the outer wall of the inner layer 84 or alternatively or additionally, one or more fins 97 can project inwardly from the inner wall of the outer layer 88.

The first blending container 32 may include an open end 113 through which material may be inserted in advance of blending or may exit after blending. The open end 113 may be of any appropriate configuration and size. The open end 113 may be of a configuration to permit a user to drink directly therefrom. This may result in the first blending container 32 being capable of utilization as a drinking vessel. The first blending container 32 may include an engaging portion 114 configured to operatively and selectively engage with the blade base 28. The engaging portion 114 may be of any appropriate configuration and type, including, without limitation being a threaded portion, a bayonet engaging member, or the like. Regardless of the configuration of the engaging portion 114, when secured to an outside portion 112 of the blade base 28, additional blending space is created between an interior portion of the blade base 28 and the open end 113 of the first blending container 32, as will be described in greater detail herein.

Figure 4:
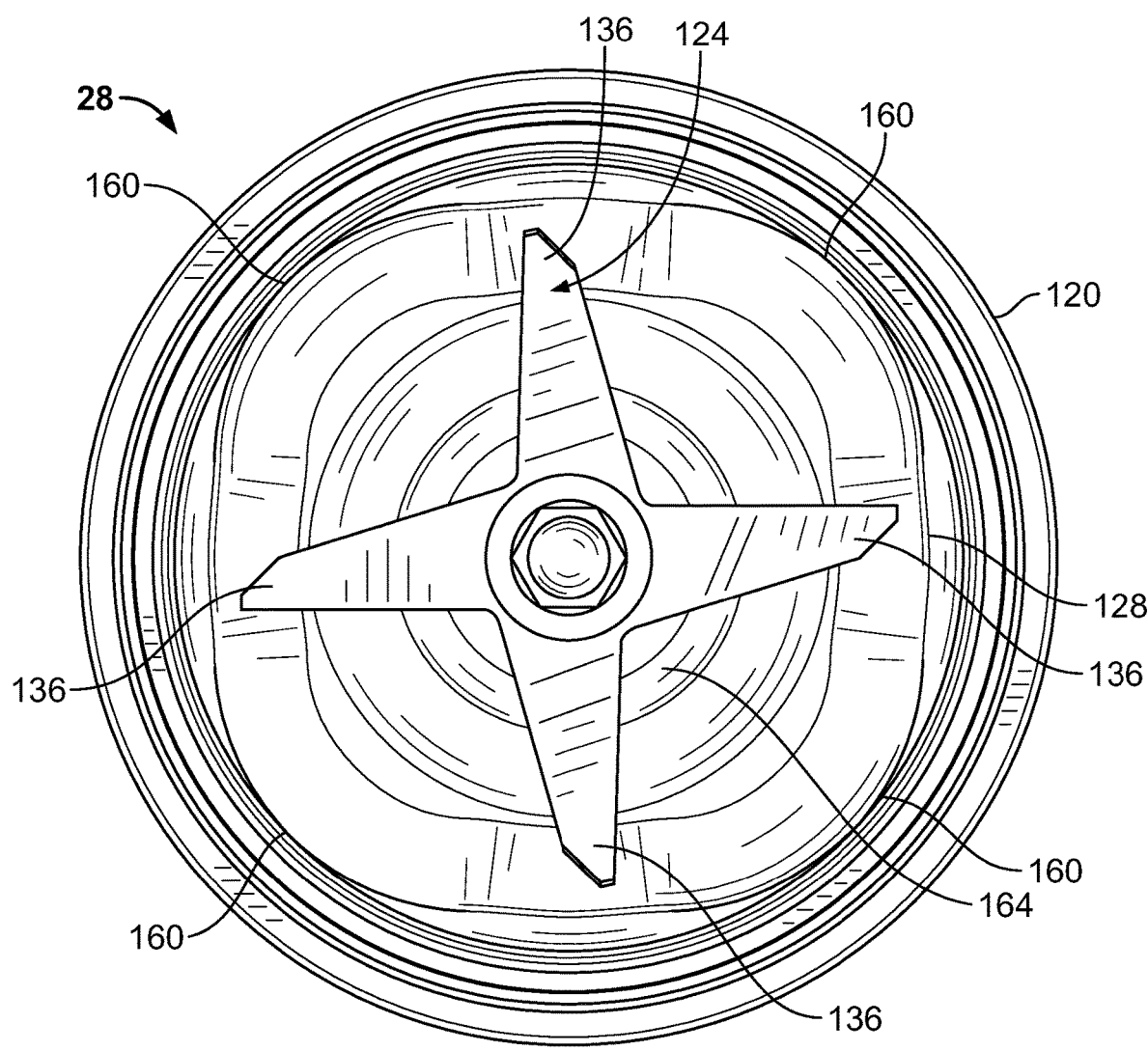
FIG. 4 is a plan view of an embodiment of a blade base.
Figure 5:
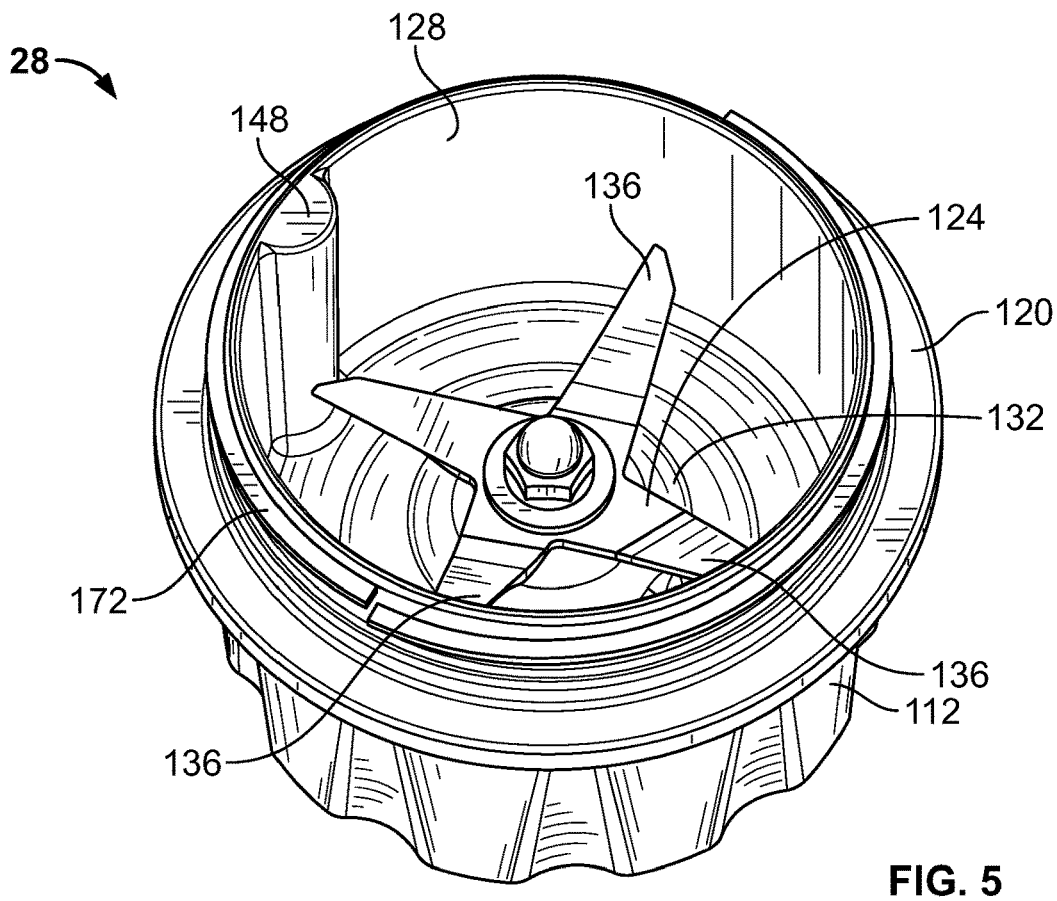
FIG. 5 is a perspective view of an embodiment of a blade base.
Figure 6:
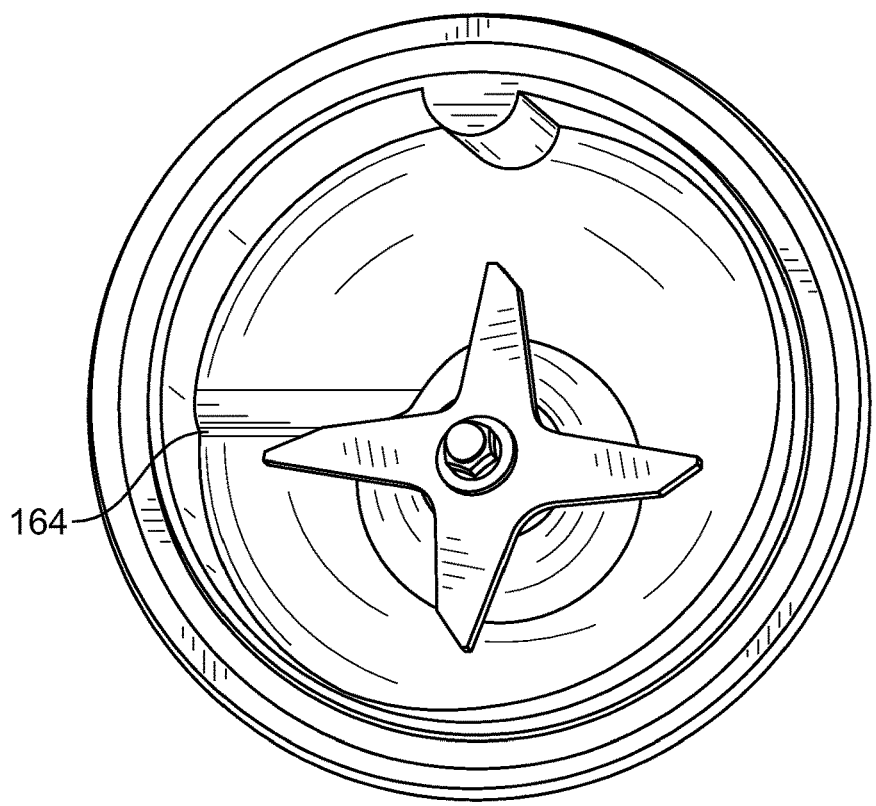
FIG. 6 is a plan view of an embodiment of a blade base.
Figure 7:
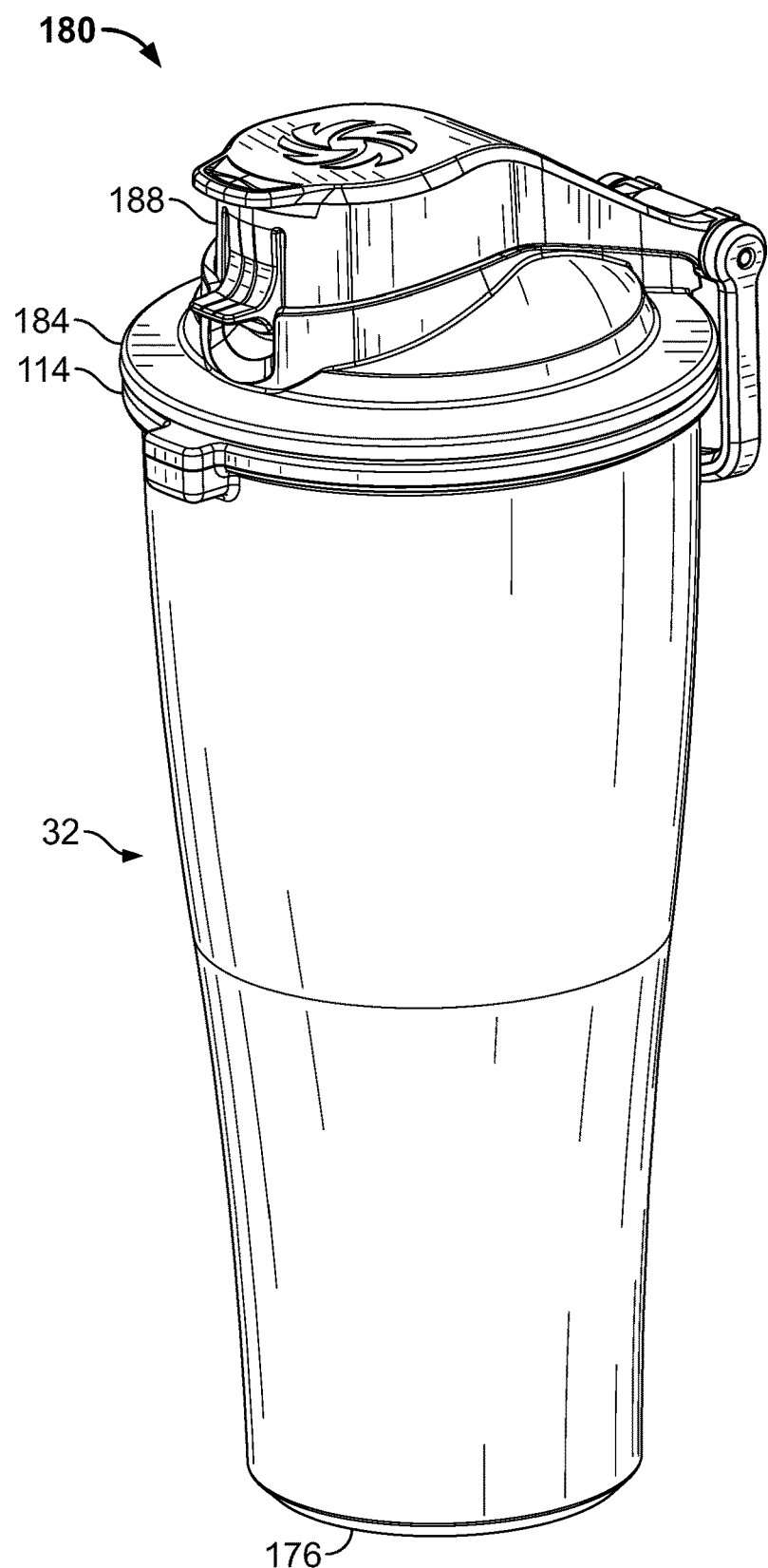
FIG. 7 is a perspective view of a blending container with a lid.
Figure 8:
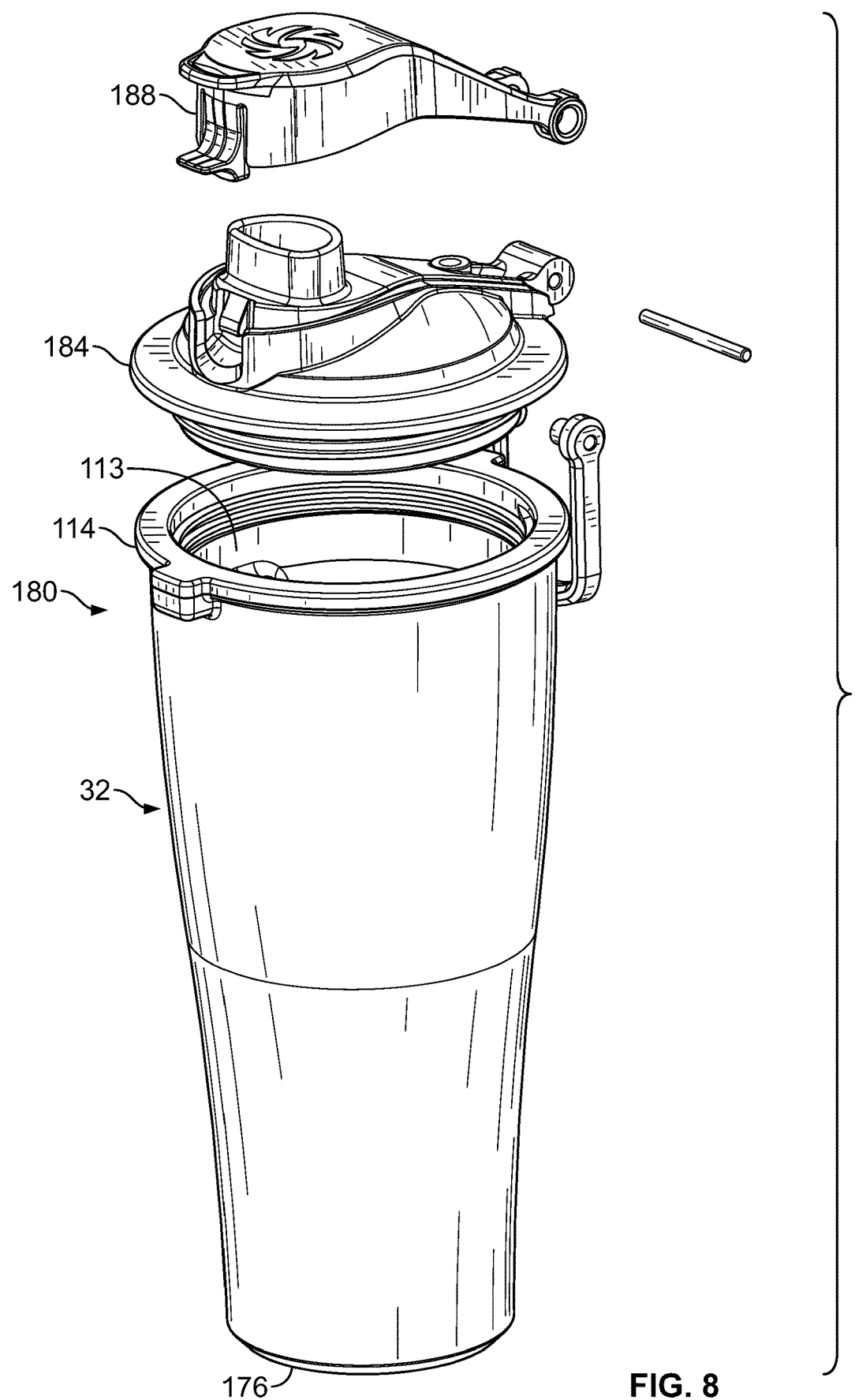
FIG. 8 is an exploded view of a blending container and lid.
Figure 9:
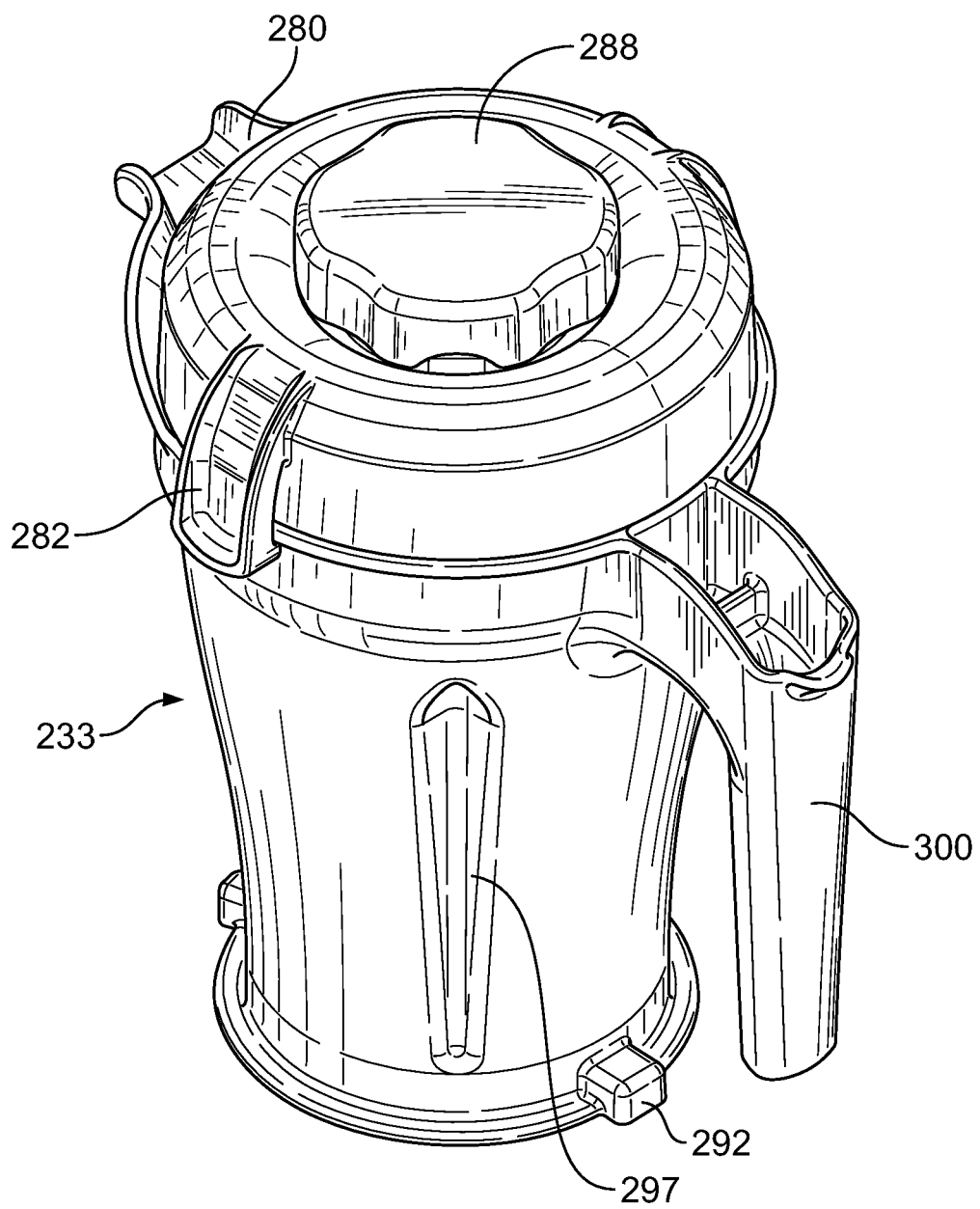
FIG. 9 is a perspective view of an embodiment of a blender container.

FIGS. 5 and 6 illustrate two different embodiments of the blade base 28. Each embodiment of the blade base 28 may be sized and shaped to operatively fit within an opening 116 in the pedestal 76 in any appropriate manner. The blade base 28 may include a housing 120 having a first side and a second side. A blade 124 is positioned within the first side of the housing 120. The housing 120 may be of any appropriate configuration. As shown in FIG. 4, the housing 120 may include a rectangular inner wall 128 wherein the corners are used for agitating the contents of the attached blender container, as will be described herein. Alternatively, as shown in FIG. 6, the housing 120 may include a generally circular inner wall 128 with one or more projections used for agitation. The blade 124 may be connected to the housing 120 in any appropriate manner. The blade 124 may be of any appropriate configuration, type and size. The present teachings are not limited to the configuration shown and described. By way of a non-limiting example, the blade 124 can be of a conventional blender blade configuration and, as such, includes a plurality of radially extending blades 136 that are carried by, and positioned above a bottom surface of the blender base 28 by a vertically oriented blade shaft. The blade shaft extends downwardly through a hub to the second side of the blender base 28. A spline is secured to the end of the blade shaft on the second side of the blender base 28. The spline of the blade shaft engages with a splined coupler positioned within the pedestal, the splined coupler being connected to a motor shaft. Accordingly, when the blade base 28 is positioned within the pedestal 76, rotation of the motor shaft caused by actuation of the motor is thereby transferred to the blades, which are rotatably positioned within the blade base.

As mentioned above, the blade base 28 may include features to agitate the flow of material with the blender container 32. For example, the blade base 28 may break up flow of material within the blender container 32 during operation of the blending system 20. In the embodiment shown in FIG. 5, the blade base 28 may include a protrusion 148 on the inner wall 128 of the housing 120. The protrusion 148 may be of any appropriate shape and size. By way of a non-limiting example, the protrusion 148 may be a protrusion 148 extending from the inner wall 128. The protrusion 148 may be any appropriate shape, such as generally rounded. The protrusion 148 may be monolithically formed with the inner wall 128 or may be attached through a subsequent operation. The protrusion 148 may be approximately ½ inch in diameter. The protrusion 148 may extend from a length of the blade base 28 from the bottom wall 132 to an open top end 152. It will be appreciated that the blade base 28 may include more than one protrusion 148. The blade base 28 may also include an agitator 164 positioned on the bottom wall 132. The agitator 164 may be of any appropriate configuration and is not limited to that shown and described. Further, any appropriate number of agitators 164 may be utilized, e.g., one, two, three, etc. In some embodiments, the blade base 28 may not include an agitator 164. The agitator 164 may include a ramped surface formed in the bottom wall 132. The ramped surface may be of any appropriate configuration, including, without limitation being a helical ramp formed with the bottom wall 132. The agitator 164 may be monolithically formed with the bottom wall 132 or may be attached through a subsequent operation. The agitator 164 may form a ledge 168 in the bottom wall 132, which may be utilized to disrupt the flow pattern of the material during use of the blending system 20. The blade base 28 may include one or more agitator 164; the present teachings are not limited to that shown. Further, the bottom wall 132 may not include an agitator 164.

In addition or alternatively, as shown in FIG. 4, the inner wall 128 of the blade base 28 may be of a shape to agitate the flow of material within the blending container 32 during operation thereof. In these embodiments, the base 132 may have a generally rectangular shape such as a generally square shape The engagement between the blade base 28 and the first and/or second blending container is such that corners 160 of the square-shaped inner wall 128 align with the ribs 96 formed within the inner wall of the container. The alignment of the corners 160 and the ribs 96 increases the agitation of the material in the container during the blending operation, thereby improving the blend quality and enhancing the blender performance. Once aligned, the user can also visually confirm that the blade base 28 is operatively secured with the blending container 32.

The blade base 28 may include an engaging portion 172 configured to operatively and selectively secure with the engaging portion 114 of the blending container 32. The engaging portion 172 may be of any appropriate configuration. By way of a non-limiting example, the engaging portion 172 may be a threaded portion 172 configured to mate with the threaded portion 114 of the container portion 32. In these embodiments, the threaded portion 114 of the container portion 32 may be generally circular and the threaded portion 172 of the blade base 28 may correspondingly circular in shape. As described above, the first blending container 32 may be configured as a drinking vessel. In these embodiments, the first blending container 32 is able to easily convert from a blending container to a drinking vessel. For example, in addition to the open end 113 noted above, the first blending container 32 may include a closed end 176 generally opposite the open end 113. When the first blending container 32 is operatively secured to the blade base 28, the housing 120 of the blade base 28 is configured such that the housing 120 may create additional blending space for the material to be blended. As an example, the location of the blade 124 within the housing 120 may be generally cup-shaped, which may provide this additional blending space. When removed from the blade base 28, the first blending container 32 may function as a drinking vessel. In some embodiments, the first blending container 32 may include a lid assembly 180 that is selectively engageable with the open end 113 of the first blending container 32. The lid assembly 180 may be of any appropriate configuration. For example, the lid assembly 180 may include a base member 184 that may be selectively engageable with the open end 113 in any appropriate manner, including, without limitation via a snap-fit, a threaded engagement, or any appropriate means. The lid assembly 180 may further include a cap 188 that may be selectively positionable relative the base member 184. The cap 188 may be positionable to and from open and closed positions. In the open position, the cap 188 may allow contents within the blending container 32 to be expelled therefrom. In the closed position, the cap 188 may generally prevent contents of the blending container 32 to be expelled. Further, in the closed position, the cap 188 may be engaged with the base member 184 to create a generally liquid tight seal such that regardless of the position of the blending container 32 the contents within the blending container will not be expelled therefrom. In this closed position, the blending container 32 may be utilized during travel or otherwise in storage of the contents therein.

Alternatively or in addition, the blending system 20 may include a second blending container 233 of a different configuration that the first blending container 233, such as being a larger size than the first blending container 32, e.g., the second blending container 233 may have a volume of 40 oz. The second blending container 233 may include at least one spout 280. Alternatively or in addition, the second blending container 233 may have at second spout 282. The second blending container 233 also may include at least one handle 300 for ease of use. The second blending container 233 may be vented to allow hot liquids to vent during operation of the blending system 20. A tamper or other apparatus may be used to agitate the contents of the second blending container 233, such as know in the art.

The first blending container 32 may be a double-walled container having an inner layer 84 and an outer layer 88 spaced from the inner layer 84. A space 92 may be formed between the inner and outer layers 84, 88. The space 92 may provide an insulative feature to the first blending container 32, i.e., it may help the contents thereof remain cool or warm, as applicable. Further, the first blending container 32 may include elongated ribs 96 projecting from an interior side 100 of the inner layer 84 into a blending are of the first blending container 32. The ribs 96 may comprise one or more protrusions generally spanning a length of the blending container 32. In the present example, there are two ribs spaced at opposing sides of the first blending container 32. The ribs 96 may be configured to aid in agitating the contents of the first blending container 32 during blending.

As described above, the blending container 32 and blade base 28 may include the interlock feature 34. The interlock feature 34 may be of any appropriate configuration to generally prevent access to the blade 124 when it is spinning. As shown in FIG. 3A, for example, the blending container 32 may include a first tab 192 extending therefrom. As shown in FIG. 3A, the first tab 192 may include a magnet 196 embedded therein. The at least one magnet 196 may be secured with the blending container 32 in any appropriate manner. By way of a non-limiting example, the magnet 196 may be welded into a pocket 200 formed in the blending container 32 between the inner layer 84 and the outer layer 88. In a further non-limiting example, the magnet 196 may be adhered, such as through use of an adhesive, between the inner layer 84 and the outer layer 88 of the blending container 32.

Further, as shown, the blending container 32 may include a second tab 204 extending therefrom. The second tab 204 may be of a similar configuration as the first tab 192, but may be of a different size. Further, the second tab 204 may be offset from the first tab 192 along the circumference of the blending container 32 at an angle that is not 180 degrees. In other words, the first tab 192 and second tab 204 are not aligned with one another, as described in more detail below. The second tab 204 may include a second magnet 208 embedded therein. The second magnet 208 may be welded into a second pocket 212 formed in the blending container 32 between the inner layer 84 and the outer layer 88. In a further non-limiting example, the second magnet 208 may be adhered, such as through use of an adhesive, between the inner layer 84 and the outer layer 88 of the blending container 32. While the first tab 192 and second tab 204 with the magnet 196 and second magnet 208 are shown and described, any number of tabs and magnets may be used without departing from the present teachings. Further still, the number of tabs and magnets utilized are not limited to that shown. Any appropriate number of tabs and magnets may be utilized, e.g., three, four, etc.

In these embodiments, the first magnet 196 and second magnet 208 may be positioned in the tabs 192 and 204, respectively. Once inserted therein, the inner and outer layers 84, 88 may be sonic welded together. Once sonic welded, the magnets 196 and 208 are melted into the tabs 192 and 204 capturing the magnets 196 and 208 between the inner and outer layers 84, 88.

Figure 13:
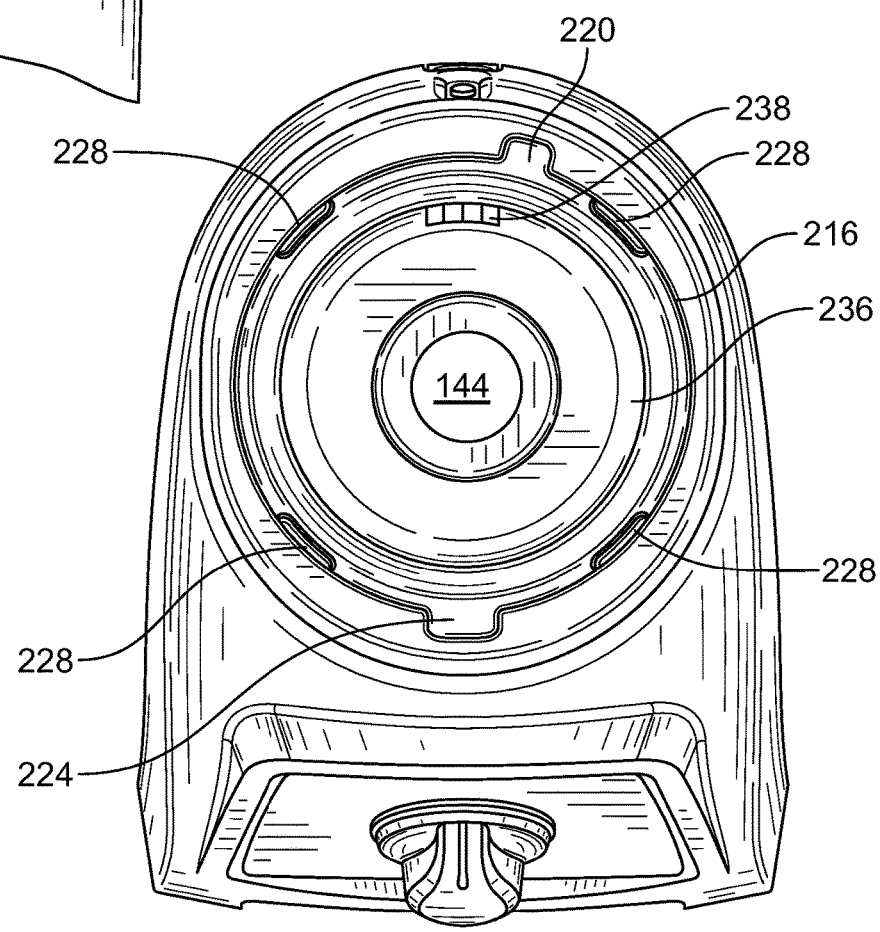
FIG. 13 is a plan view of a blender base.

As shown in FIG. 13, the blender base 24 may include a lip 216 in the opening 116 in the pedestal 76; the lip 216 may generally encompass a majority portion or all of the opening 116. The lip 216 may include first and second recessed portions 220, 224. The first and second recessed portions 220, 224 may be configured such that the tab 192 and second tab 204 are selectively and operatively engageable with such first and second recessed portions 220, 224. The first recessed portion 220 may be shaped and sized such that only the first tab 192 may be capable of operatively engaging it. Similarly, the second recessed portion 224 may be shaped and sized such that only the second tab 204 is operatively engageable therewith. This configuration may help align the blending container 32 and blade base 28 with the blender base 24. As noted above regarding the relative positions of the tab 192 and second tab 204, the first and second recessed portions 220, 224 may be offset from one another such that they are not aligned at 180 degrees with respect to one another.

Further each of the first and second recessed portions 220, 224 may include a sensor, such as a reed switch (not shown) in its proximity. The reed switch may be utilized to indicate when both of the tab 192 and second tab 204 are operatively positioned within the first and second recesses 220, 224. Contacts of the reed switch may be in normally open position when the magnets 196 and 208 are not in proximity thereto, i.e., when the tabs 192 and 204 are not positioned in the first and second recessed portions 220, 224. When the magnets 196 and 208 within the tabs 192, 204, respectively, are moved in operative proximity to the reed switch, the reed switch will close, i.e., the reed switch will close when a magnetic field is present. Once the magnets 196 and 208 are moved away from the switch, the reed switch will go back to its original open position.

When the reed switch is in the open position, the motor 40 is configured to be disabled, i.e., not operate. When the motor 40 is disabled, the blade base 28 and more particularly, the blade 124 is not capable of operation. Therefore, in order to operate the blending system 20, the blending container 32 and blade base 28 must be operatively coupled with the blender base 24. Specifically, the tabs 192 and 208 must be operatively positioned within the first and second recessed portions 220, 224, respectively in order for the blending system 20 to operate. This generally prevents the user from being able to access or otherwise contact the blade 124.

The aforementioned interlock feature 34 is further configured to generally prevent circumvention by a user. For example, the reed switch may be calibrated to disengage or disable the motor 40 anytime the magnet 196 or second magnet 208 or both are a predetermined distance away from the reed switch. The predetermined distance may be calibrated so that the user may not create enough space between the blending container 32, blade base 28 or blender base 24 to access the blade 124.

While the blending system 20 is operating, i.e., the motor 40 is operating, the blending system 20 tends to attempt to rotate the blending container 32 relative to the blender base 24. The tabs 192 and 204 being engaged with the first and second recessed portions 220, 224, respectively may prevent the blending container 32 from rotating—it may maintain the blending container 32 in its operative position with respect to the blender base 24. The tabs 192 and 204 may be generally rectangular in shape. Further, the corresponding first and second recessed portions 220, 224 may be of a corresponding rectangular shape. The rectangular shape may provide the anti-rotation feature generally keeping the interlock feature 34 operatively aligned.

Figure 10:
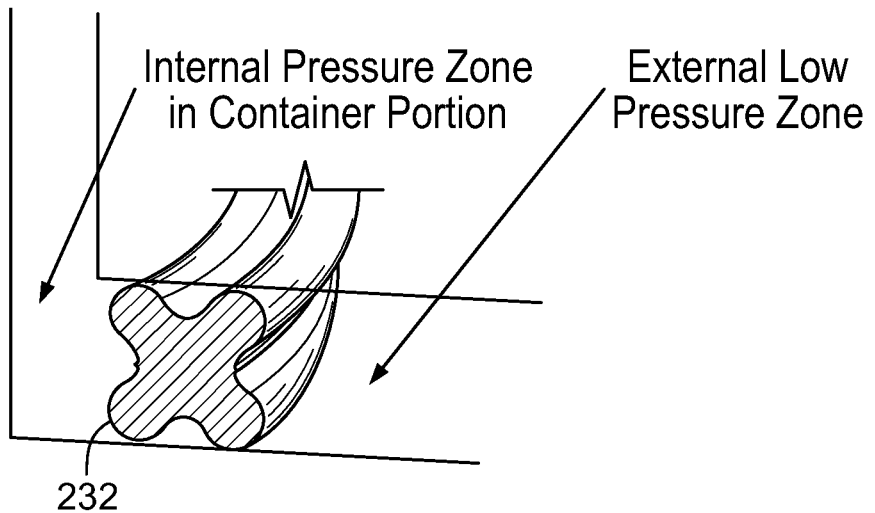
FIG. 10 is a cross-sectional view of a gasket of a blender system.
Figure 11:
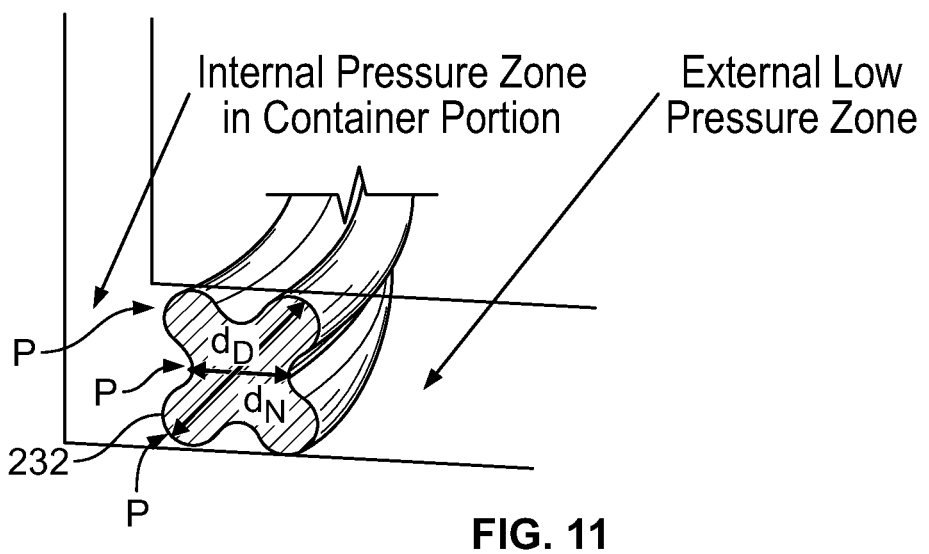
FIG. 11 is a cross-sectional view of a gasket of a blender system.

The blade base 28 may further include a gasket 232 configured to provide a seal between the blade base 28 and blending container 32 when coupled together. The gasket 232 may have a generally X-shaped cross section, such as shown in FIG. 10. The gasket 232 may generally span the periphery of the blade base 28 such that when the blade base 28 and blending container 32 are coupled—such as being threaded together—the gasket 232 is positioned along the entirety of a location of engagement between the blade base 28 and blending container. While the gasket 232 is shown as having a generally X-shaped cross-section, it will be appreciated that the gasket 232 may have any appropriate cross-sectional shape that performs the same function described below. By way of a non-limiting example, the gasket 232 may have a diameter of a narrow portion $d_N$ that is shorter than a diameter of a distended portion $d_D$, such as shown in FIG. 11. The gasket 232 may be formed of any appropriate material, including, but not limited to, polymeric materials such as elastomers or rubbers including thermoplastic or thermoset elastomers, rubber-based materials, and other polymers and co-polymers having properties consistent with the features described above.

Figure 12:
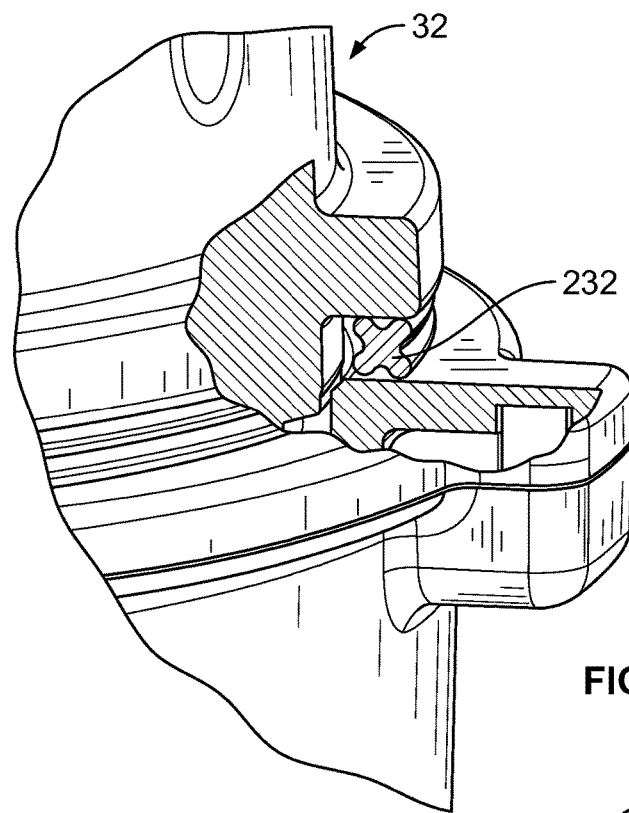
FIG. 12 is a cross-sectional view of a gasket on a blending system.

The gasket 232 may be configured to seal at low pressures and allow gas to exit at pressures that exceed a predetermined pressure within the blending container 32 during operation of the blending system 20. For example, the gasket 232 may function as a seal when the internal pressure zone within the blending container 32 exists from zero pressure to the predetermined level of pressure. After the internal pressure zone within the blending container 32 exceeds the predetermined level pressure—this may be considered a high pressure condition—the configuration of the gasket 232 may displace the gas within the blending container 32 to safely relieve pressure from the internal pressure zone, as shown in FIG. 11. The gasket 232, however, also maintains its operative position between the blending container 32 and the blade base 28 so that material within the blending container 32 does not leak as shown in FIG. 12.

In operation, if the user requires the blending system 20 to perform a recipe requiring a longer operation time, the friction of the spinning blade 124 may generate heat within the blending container 32. As the heat in the blending container 32 increases, so does the pressure. As the operation continues, the pressure may continue to build up to a predetermined level. If the force of the internal pressure zone increases above that predetermined level, the gasket 232 is configured to displace that internal pressure to allow interior pressure to escape into the atmosphere. The shape of the gasket 232 allows the internal gas of the blending container 32 to escape while the solids and liquids remain within the blending container 32. Thus, the pressure within the blending container 32 is generally prevented from exceeding a predetermined level.

The blending system 20 may, however, include a spill moat 236 if any liquid escapes from the blending container 32 either during operation, during insertion of the material to be blending or while expelling the material from the blending container 32. The spill moat 236 may be of any appropriate configuration and may be positioned in the pedestal 76. By way of a non-limiting example, the spill moat 236 may be positioned on the periphery of the pedestal 76. The spill moat 236 may be configured to capture any escaping liquid and allow it to flow along a predetermined path. At a conclusion of the predetermined path of the spill moat 236, the blender base 24 may include at least one aperture 238. The aperture 238 may be configured to allow the liquid to exit from the blending system 20. The combination of the spill moat 236 and aperture 238 may generally prevent liquid from inadvertently entering the blender base 24 and more specifically from entering the working components of the blending system 20, such as the motor 40.

Although the embodiments of the present teachings have been illustrated in the accompanying drawings and described in the foregoing detailed description, it is to be understood that the present teachings are not to be limited to just the embodiments disclosed, but that the teachings described herein are capable of numerous rearrangements, modifications and substitutions.

What is claimed is:

1. A blending system comprising:
a base encasing a motor and a splined coupler;
a blade assembly comprising a first side and a second side, the first side comprising one or more blades and the second side comprising a spline, wherein the spline operatively interfaces with the splined coupler, and wherein the blade assembly is selectively engagable with the base;
a container selectively engaged with the blade assembly; and
a gasket operatively positioned between the container and blade assembly, the gasket comprising at least one protrusion extending from a narrow portion and positioned between the container and blade assembly,
wherein the at least one protrusion and the narrow portion operatively create an air-tight seal between the blade assembly and container at a first pressure and allow gas to exit between the container and blade assembly at a second pressure while operatively generally preventing solids from exiting between the container and the blade assembly.

2. The blending system of claim 1, wherein the gasket has a generally X-shaped cross-section.

3. The blending system of claim 2, wherein the generally X-shaped cross-section of the gasket has a diameter of the narrow portion, $d_N$, and a diameter of a distended portion including the at least one protrusion, $d_D$, wherein $d_N < d_D$.

4. The blending system of claim 3, wherein the first pressure is less than the second pressure.

5. The blending system of claim 1, wherein the first pressure is less than the second pressure.

6. The blending system of claim 1, wherein the gasket operatively prevents liquids from exiting between the container and blade assembly at the second pressure.

7. A blending system comprising:
a container comprising an open end and a closed end;
a blade assembly comprises one or more blades and a spline, wherein the blade assembly is selectively engagable with the open end of the container such that the one or more blades extend within the container and the spline extends away from the open end; and
a gasket operatively positioned between the container and blade assembly, the gasket comprising a generally distended portion extending from a general center, and
wherein the gasket operatively prevents liquids and solids from exiting between the container and blade assembly while allowing gas to exit the container at a threshold pressure level.

8. The blending system of claim 7, wherein the generally distended portion comprises one or more protrusions.

9. The blending system of claim 7, wherein the generally distended portion extending from the general center forms a generally X-shaped cross-section.

10. The blending system of claim 7, wherein the generally distended portion comprises rounded edges.

11. The blending system of claim 10, wherein intersections of the generally distended portion are generally concave.

12. The blending system of claim 7, wherein the gasket is operatively positioned between the container and the blade assembly, and
wherein at least one side of the gasket is uncovered when the blending system is in operation.

13. A blending system comprising:
a base encasing a motor;
a container;
a blade assembly selectively engaged with an open end of the container, wherein the blade assembly is selectively positioned between the base and the container in an operative position; and
a gasket positioned between the container and blade assembly,
wherein the gasket operatively creates an air-tight seal between the blade assembly and container at a first pressure and allows gas to exit between the container and blade assembly at a second pressure during operation of the motor such that the blending system remains operational.

14. The blending system of claim 13, wherein the gasket transitions from a first state defined by allowing gas to exit to a second state defined by preventing gas from exiting as pressure changes from the second pressure to the first pressure.

* * * * *